United States Patent [19]

Mark, deceased et al.

[11] Patent Number: 4,728,716

[45] Date of Patent: Mar. 1, 1988

[54] POLYCARBONATE EXHIBITING IMPROVED IMPACT PROPERTIES CONTAINING DIVALENT RESIDUE OF POLYMERIZED ALKADIENE MONOMER

[75] Inventors: Victor Mark, deceased, late of Evansville, Ind., by Carol M. Mark, legal representative; Ester H. Mark, legal representative, Springville, N.Y.; Edward N. Peters, Lenox, Mass.

[73] Assignee: General Electric Company, Mt. Vernon, Ind.

[21] Appl. No.: 797,258

[22] Filed: Nov. 12, 1985

[51] Int. Cl.$^4$ ............................................. C08G 63/62
[52] U.S. Cl. ............................... 528/196; 524/611; 525/146; 525/147; 525/331.9; 525/333.2; 525/462; 525/468; 525/469
[58] Field of Search ............... 528/196; 525/462, 468, 525/469, 146, 147, 331.9, 333.2

[56] References Cited

U.S. PATENT DOCUMENTS

| | | | |
|---|---|---|---|
| 4,381,358 | 4/1983 | Rosenquist | 524/114 |
| 4,415,722 | 11/1983 | Mark et al. | 528/196 |
| 4,476,294 | 10/1984 | Mark | 528/125 |
| 4,501,875 | 2/1985 | Mark | 528/196 |
| 4,504,649 | 3/1985 | Mark | 528/176 |
| 4,526,956 | 2/1985 | Mark | 528/176 |
| 4,579,903 | 4/1986 | Lio et al. | 525/146 |
| 4,628,081 | 12/1986 | Mark et al. | 528/196 |
| 4,677,183 | 6/1987 | Mark et al. | 528/196 |

FOREIGN PATENT DOCUMENTS 912898  12/1962  United Kingdom ............... 528/196

*Primary Examiner*—Harold D. Anderson
*Attorney, Agent, or Firm*—Martin B. Barancik

[57] ABSTRACT

An aromatic carbonate resin comprised of:

(i) at least one recurring structural unit represented by the formula

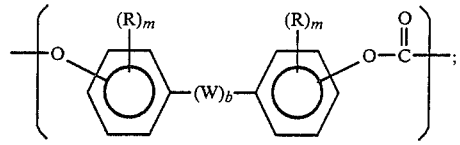

(ii) at least one recurring structural unit selected from structural units represented by the formulae

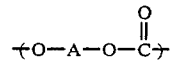

or

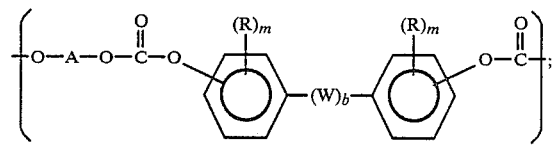

wherein R is independently selected from halogen, monovalent hydrocarbon, and monovalent hydrocarbonoxy radicals;

W is selected from divalent hydrocarbon radicals, —O—, —S—, —S—S—,

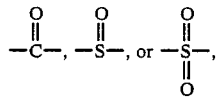

A is a divalent residue of at least one conjugated alkadiene and has a weight average molecular weight of at least about 600, m is independently selected from integers having a value of from 0 to 4, and b is either zero or one.

The carbonate resin contains an amount of (ii) at least effective to improve the impact properties thereof.

18 Claims, No Drawings

POLYCARBONATE EXHIBITING IMPROVED IMPACT PROPERTIES CONTAINING DIVALENT RESIDUE OF POLYMERIZED ALKADIENE MONOMER

BACKGROUND OF THE INVENTION

Polycarbonates are well known thermoplastic materials which, due to their many advantageous properties, are used as thermoplastic engineering materials. The polycarbonates may generally be prepared by the reaction of a carbonate precursor such as phosgene with a dihydric phenol such as bisphenol-A. These polycarbonates exhibit, for example, excellent properties of toughness, flexibility, optical transparency, and high heat distortion temperatures. However, in certain applications better impact properties than those possessed by conventional polycarbonates are required. It is known that the impact properties of polycarbonates can be improved by blending with the polycarbonate resins certain impact modifiers. While the resultant compositions exhibit improved impact properties, the use of impact modifier additives suffers from several disadvantages. Among these disadvantages is the fact that some of these impact modifying additives tend to adversely affect the optical properties, such as transparency, of the polycarbonates.

It would be very advantageous if polycarbonates could be provided which exhibit improved impact properties as compared to conventional polycarbonates and simultaneously retain the excellent optical properties of these conventional polycarbonates. It is, therefore, an object of the instant invention to provide polycarbonate resins exhibiting better impact properties than conventional polycarbonates.

SUMMARY OF THE INVENTION

In accordance with the instant invention there are provided novel carbonate resins comprised of the polymerized reaction products of (i) at least one dihydric phenol, (ii) a carbonate precursor, and (iii) at least one polymer selected from polymers represented by the formulae

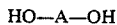

or

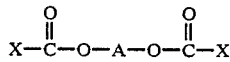

wherein A represents a divalent residue of a polymerized conjugated alkadiene and has a weight average molecular weight of at least about 600, and X is independently selected from halogen radicals.

DESCRIPTION OF THE INVENTION

It has been discovered that carbonate resins can be obtained which exhibit improved impact properties as compared with conventional resins such as those derived from bisphenol-A and a carbonate precursor such as phosgene.

The carbonate resins of this invention are comprised of the reaction products of (i) at least one dihydric phenol, (ii) a carbonate precursor, and (iii) an amount at least effective to improve the impact properties of said resin of at least one polymer selected from polymers represented by the formulae

and

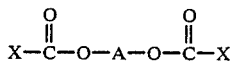

wherein A is selected from the divalent residues of polymerized conjugated alkadiene monomers and has a weight average molecular weight of at least about 600, and X is independently selected from halogen radicals. The polymerized conjugated alkadiene monomer residue A has a weight average molecular weight of at least about 600, preferably at least about 800, and more preferably at least about 1,000. The upper range of the weight average molecular weight of A should generally not exceed about 20,000, preferably 10,000.

The conjugated alkadiene monomers used in the preparation of A may be represented by the general formula

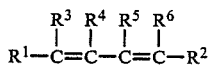

wherein $R^1$–$R^6$ are independently selected from hydrogen, halogen, and alkyl radicals, with the proviso that not more than two of $R^1$–$R^6$ are halogen radicals.

The preferred alkyl radicals are those containing from 1 to about 5 carbon atoms. These alkyl radicals include both the straight chain and the branched alkyl radicals. However, the preferred alkyl radicals are the straight chain alkyl radicals. It is particularly preferred that if $R^1$ and/or $R^2$ are alkyl radicals that they be straight chain alkyl radicals. The preferred halogen radicals are chlorine and bromine.

Preferred conjugated alkadiene monomers are those wherein $R^1$ and $R^2$ are independently selected from hydrogen and alkyl radicals. More preferred conjugated alkadiene monomers of Formula III are those wherein $R^1$–$R^6$ are independently selected from hydrogen and alkyl radicals, with the 1,3-alkadienes of this type being preferred.

Some illustrative non-limiting examples of conjugated alkadiene monomers of Formula III include 1,3-butadiene, 2-chloro-1,3-butadiene, 2-methyl-1,3- butadiene, 1,3- heptadiene, 2- methyl-1,3-pentadiene, 2-methyl-3-ethyl-1,3-butadiene, 2-ethyl-1,3-pentadiene, 1,3-hexadiene, and 2,4-hexadiene.

Particularly useful conjugated alkadiene monomers are 1,3-butadiene, 2-methyl-1,3-butadiene, and mixtures thereof.

The compounds of Formulae I and II, as well as the monomers of Formula III from which they are derived, are generally well known in the art and are generally commercially available or may be readily prepared by known methods. Thus, for example, one method of polymerizing the conjugated alkadiene monomers of Formula III is described in Billmeyer, Fred W., Jr., *Textbook of Polymer Science,* Interscience Publishers, New York, 1962, pages 192, 348-352 and 377-393, which is hereby incorporated herein by reference.

When A is the residue of a polymerized 1,3-butadiene it may be 1,2-polybutadiene, i.e.,

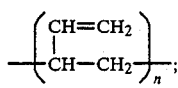

cis-1,4-polybutadiene, i.e.,

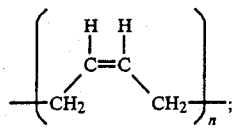

trans-1,4-polybutadiene, i.e.,

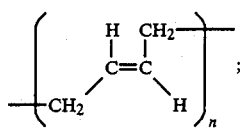

or mixtures thereof.

If A is the residue of polymerized 2-methyl-1,3-butadiene, i.e., polyisoprene, it is preferred that it to be cis-1,4-polyisoprene.

In Formulae IV–IVb n has a value of at least about 10 and may be as high as about 400. If mixtures of IV–IVb are used then the sum of the ns has a value of at least ten (in such case n may have a value as low as 1 provided that the sum of n+n+n is at least about 10).

Some illustrative non-limiting examples of the compounds of Formulae I and II include:

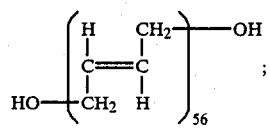

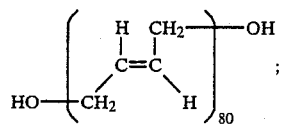

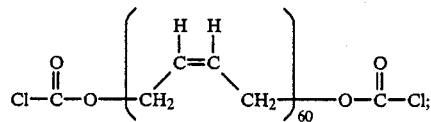

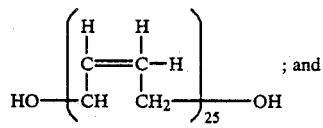

(a mixture of the cis and trans isomers).

It is to be understood that A may contain the polymerized reaction product of only one conjugated alkadiene of Formula III or it may contain the polymerized reaction products of a mixture of two or more different conjugated alkadiene monomers of Formula III.

As mentioned hereinafore A may have a weight average molecular weight as high as about 20,000. It is preferred however, that A have a weight average molecular weight between about 1,000 and about 10,000.

The amount of the compounds of Formulae I and/or II utilized in the preparation of the carbonate resins of the instant invention is an amount which is effective to improve the impact properties, e.g., impact strength, of the carbonate resin. Generally this amount is at least about 1 weight percent, preferably at least about 2 weight percent, more preferably at least about 3 weight percent, and most preferably at least about 4 weight percent. Weight percent of compounds I and/or II is based on the total amounts of said compounds and dihydric phenol utilized in the formation of the instant carbonate resins.

In general, if less than about 1 weight percent of compounds I and/or II is used there is no noticeable improvement in the impact properties of the resin.

If the amount of compounds I and/or II used is relatively large, e.g., in excess of about 40 weight percent, the resultant carbonate resins exhibit rubbery and elastomeric characteristics.

Thus the upper limit of said compounds that may be used is generally dependant upon the properties that it is desired for the carbonate resin to exhibit. For example, if it is desired to produce a resin exhibiting a high degree of rubbery or elastomeric properties relatively large amounts of these compounds are used. If, on the other hand, a resin exhibiting a lesser degree of rubbery and elastomeric properties is desired, a smaller amount of the instant compounds of Formulae I and/or II are used. Generally, an amount of compounds of Formulae I and/or II exceeding about 75 weight percent, preferably about 70 weight percent, should not be used.

Generally a resin which is derived from about 1 to about 40 weight percent, preferably from about 2 to about 30 weight percent, more preferably from about 3 to about 25 weight percent, and most preferably from about 4 to about 20 weight percent of the compounds of Formulae I and/or II exhibits a particularly good mix of properties, i.e., improved impact strength as compared with conventional carbonate resins and a substantial degree of substantially most of the other advantageous physical properties of conventional carbonate resins. Thus, if the impact strength is of particular interest, the amount of the instant compounds should not exceed about 40 weight percent. If elastomeric or rubbery properties are of interest the amount of compounds I and/or II can exceed about 40 weight percent.

In the preparation of the instant carbonate polymers only one compound of Formula I and/or II may be used or a mixture of two or more different compounds of Formulae I and/or II may be employed.

The dihydric phenols which are used in the preparation of the instant carbonate resins are well known in the art and are desribed, inter alia, in U.S. Pat. Nos. 3,018,365, 2,999,835, 3,148, 172, 3,271,368, 2,991,273, 3,271,367, 3,280,078, 3,041,891 and 2,999,846, all of which are incorporated herein by reference.

These dihydric phenols will in general conform to the general formula

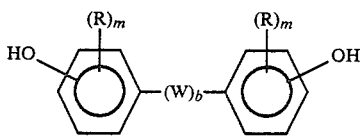

wherein:

R is independently selected from halogen, monovalent hydrocarbon, and monovalent hydrocarbonoxy radicals;

W is selected from divalent hydrocarbon radicals, —O—, —S—, —S—S—,

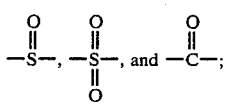

m is independently selected from whole numbers having a value of from 0 to 4 inclusive; and b is either zero or one.

Preferred halogen radicals represented by R are chlorine and bromine. The monovalent hydrocarbon radicals represented by R include alkyl, cycloalkyl, aryl, aralkyl, and alkaryl radicals.

The preferred alkyl radicals represented by R are those containing from 1 to about 10 carbon atoms. The preferred cycloalkyl radicals represented by R are those containing from 4 to about 8 ring carbon atoms. The preferred aryl radicals are those containing from 6 to 12 ring carbon atoms, i.e., phenyl, naphthyl, and biphenyl. The preferred aralkyl and alkaryl radicals are those containing from 7 to about 14 carbon atoms.

The monovalent hydrocarbonoxy radicals represented by R have the general formula —OR', wherein R' has the same meaning as R. Preferred hydrocarbonoxy radicals are the alkoxy and the aryloxy radicals.

The divalent hydrocarbon radicals represented by W include the alkylene radicals, alkylidene radicals, cycloalkylene radicals, and cycloalkylidene radicals. Preferred alkylene radicals are those containing from 2 to about 20 carbon atoms. Preferred alkylidene radicals are those containing from 1 to about 20 carbon atoms. Preferred cycloalkylene and cycloalkylidene radicals are those containing from 6 to about 16 ring carbon atoms.

Some illustrative non-limiting examples of the dihydric phenols represented by Formula V include:

2,2-bis(4-hydroxyphenyl)propane (bisphenol-A);
2,2-bis(3,5-dimethyl-4-hydroxyphenyl)propane;
2,2-bis(3,5-dibromo-4-hydroxyphenyl)propane;
1,1-bis(4-hydroxyphenyl)cyclohexane;
1,1-bis(3,5-dimethyl-4-hydroxyphenyl)cyclohexane;
1,1-bis(4-hydroxyphenyl)pentane;
bis(4-hydroxyphenyl)methane;
bis(3,5-diethyl-4-hydroxyphenyl)methane;
1,3-bis(4-hydroxyphenyl)propane;
4,4'-thiodiphenol; and
4,4'-dihydroxy-2,6-dimethyldiphenyl ether.

The carbonate precursors useful in the practice of the instant invention include the carbonyl halides, the bishaloformates, and the diaryl carbonates. The carbonyl halides include carbonyl chloride, carbonyl bromide, and mixtures thereof. The bishaloformates include the bishaloformates of dihydric phenols such as bisphenol-A, hydroquinone, and the like; and the bishaloformates of glycols such as ethylene glycol and neopentyl glycol.

Typical of the diaryl carbonates are diphenyl carbonate and di(alkylphenyl)carbonates such as di(tolyl) carbonate. Some other illustrative examples of suitable diarylcarbonates include di(naphthyl) carbonate, phenyl tolyl carbonate, and the like.

The preferred carbonate precursor is carbonyl chloride, also known as phosgene.

The polycarbonates of the instant invention may be prepared by known conventional methods such as, for example, interfacial polymerization, pyridine process, melt polymerization, and the like. Particularly useful processes for the preparation of the instant carbonate resins are the interfacial polymerization process and the pyridine process.

The interfacial polymerization process involves the use of an aqueous caustic solution, an organic water immiscible solvent such as methylene chloride, at least one dihydric phenol of Formula V, a carbonate precursor, at least one compound of Formulae I and/or II, a catalyst, and a molecular weight regulator.

The catalysts which may be employed can be any of the well known catalysts which catalyze the polycarbonate forming reaction. These catalysts include, but are not limited to, tertiary amines such as triethylamine, quaternary ammonium compounds, and quaternary phosphonium compounds.

The molecular weight regulators employed may be any of the known compounds that regulate the molecular weight of the carbonate polymer by a chain terminating mechanism. These compounds include, but are not limited to, phenol, tertiarybutyl phenol, chroman-I, and the like.

The pyridine process involves the use of an organic base such as pyridine, an organic solvent such as methylene chloride, at least one dihydric phenol of Formula V, a carbonate precursor, at least one compound of Formulae I and/or II, a catalyst, and a molecular weight regulator.

Also included herein are the randomly branched thermoplastic polycarbonates. These randomly branched thermoplastic polycarbonates are prepared by using a minor amount, typically between about 0.05 and 2.0 mole percent, based on the amount of dihydric phenol used, of a polyfunctional aromatic compound which functions as a branching agent. These polyfunctional aromatic compounds contain at least three functional groups which may be hydroxyl, carboxyl, carboxylic anhydride, haloformyl, and mixtures thereof. Some illustrative non-limiting examples of these compounds include trimellitic anhydride, trimellitic acid, trimellityl trichloride, 4-chloro formyl phthalic anhydride, pyromellitic dianhydride, mellitic acid, mellitic anhydride, trimesic acid, and the like.

The polycarbonates of the instant invention have a weight average molecular weight of from about 20,000 to about 200,000, preferably from about 30,000 to about 150,000. They have an intrinsic viscosity, as measured in methylene chloride at 25° C., of at least about 0.4 dl/gm, preferably from about 0.45 to about 1.0 dl/gm.

If compounds of Formula I are utilized in the preparation of the instant polycarbonate the pyridine process may be readily utilized. These polycarbonates contain the following recurring structural units:

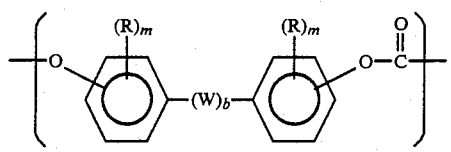

and

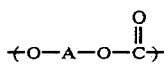

wherein R, m, W, b, and A are as defined hereinafore.

Polycarbonates of the instant invention prepared by the interfacial polymerization process using at least one compound of Formula II as one of the reactants contain the following recurring structural units:

VI, and

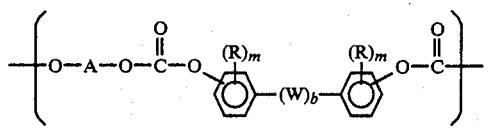

wherein R, A, W, b and m are as defined hereinafore.

In the instant polycarbonates the amounts of structural units of Formulae VIa and VIb present generally depend upon the amounts of compounds of Formulae I and/or II used in the preparation of the instant polycarbonates. Thus, for example, if 10 weight percent of compound I is used the polycarbonate resin will contain about 10 weight percent of structural unit VIa in the polymer chain.

The polycarbonate of the instant invention may optionally have admixed therewith the commonly known and used additives such as, for example, antioxidants; antistatic agents; inert fillers such as glass, talc, mica, and clay; ultraviolet radiation absorbers such as the benzophenones, benzotriazoles, and cyanoacrylates; hydrolytic stabilizers such as the epoxides; color stabilizers such as the organophosphites; and flame retardants.

Some particularly useful flame retardants are the alkali and alkaline earth metal salts of organic sulfonic acids. These types of flame retardants are disclosed, inter alia, in U.S. Pat. Nos. 3,933,734, 3,948,851, 3,926,908, 3,919,167, 3,909,490, 3,953,396, 3,931,100, 3,978, 024, 3,953,399, 3,917,559, 3,951,910 and 3,940, 366, all of which are hereby incorporated herein by reference.

Also included within the scope of the instant invention are the copolyester-carbonate resins. Briefly stated the copolyester-carbonates comprise recurring carbonate groups, carboxylate groups, and aromatic carbocyclic groups in the linear polymer chain in which at least some of the carbonate groups and at least some of the carboxylate groups are bonded directly to the ring carbon atoms of the aromatic carbocyclic groups.

These copolyester-carbonates contain ester bonds and carbonate bonds in the polymer chain wherein the amount of ester bonds is from about 25 to about 90 mole percent. For example, 5 moles of bisphenol-A reacting completely with 4 moles of isophthaloyl dichloride and one mole of phosgene would give a copolyester-carbonate of 80 mole percent ester bonds.

The copolyester-carbonates of the instant invention are derived from (i) at least one dihydric phenol of Formula V, (ii) a carbonate precursor, (iii) at least one ester precursor, and (iv) at least one polymer of Formulae I and/or II.

The ester precursor is a difunctional carboxylic acid or an ester forming raective derivative thereof. In general any difunctional carboxylic acid or its ester forming reactive derivative conventionally used in the preparation of linear polyesters may be used in the preparation of the instant copolyester-carbonates. Generally the difunctional carboxylic acids which may be used include the aliphatic carboxylic acids, the aliphatic-aromatic carboxylic acids, and the aromatic carboxylic acids. These acids are described in U.S. Pat. No. 3,169,121, which is hereby incorporated herein by reference.

The preferred difunctional carboxylic acids and their ester forming reactive derivatives are the aromatic difunctional carboxylic acids and their ester forming reactive derivatives. Particlularly useful difunctional carboxylic acids are isophthalic acid, terephthalic acid, and mixtures thereof.

Instead of using the difunctional carboxylic acids as the ester precursor it is preferred to utilize their ester forming reactive derivatives. Thus, for example, instead of using isophthalic acid, terephthalic acid, or mixtures thereof it is preferred to use isophthaloyl dichloride, terephthaloyl dichloride, or mixtures thereof.

The copolyester-carbonates of the instant invention may be prepared by well known conventional methods. These methods include transesterification, melt polymerization, interfacial polymerization, and the pyridine process. Various of these methods are described in U.S. Pat. Nos. 3,169,121, 3,030,331, 3,207,814 and 4,188,314, all of which are incorporated herein by reference.

Particularly useful processes for the preparation of these copolyester-carbonates are the interfacial polymerization process and the pyridine process.

Copolyester-carbonates of the instant invention prepared by the pyridine process utilizing as the reactants (i) at least one dihydric phenol of Formula V, (ii) a carbonate precursor, (iii) at least one ester precursor, and (iv) at least an impact modifying amount of at least one compound of Formula I contain the following recurring strutural units:

VI, VIa,

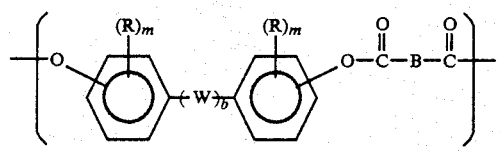

and

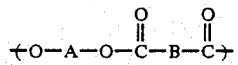

wherein A, R, m, W, and b are as defined hereinafore, and B is the divalent residue of the ester precursor. B in Formulae VII and VIIa is preferably the residue of an aromatic dicarboxylic acid or its ester forming reactive derivative, such as for example the acid dichloride. Preferred residues of aromatic dicarboxylic acids or their ester forming reactive derivatives are represented by the Formula

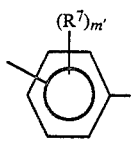

VIII.

wherein $R^7$ has the same meaning as R above and m' is an integer having a value of from 0 to 4 inclusive. Preferably $R^7$ is independently selected from lower alkyl radicals containing from 1 to about 5 carbon atoms.

Copolyester-carbonates of the instant invention prepared by the interfacial polymerization process utilizing as the reactants (i) at least one dihydric phenol of Formula V, (ii) a carbonate precursor, (iii) at least one ester precursor, and (iv) at least an impact modifying amount of at least one compound of Formula II, contain the following recurring structural units:

VI, VIb, VII, and

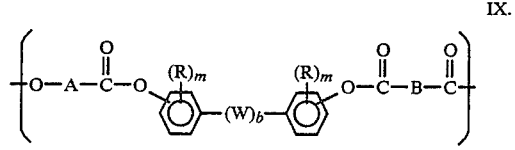

IX.

wherein A, B, R, W, m, and b are as defined hereinafore.

The amounts of structural units VIa, VIb, VIIa and IX present in the copolyester-carbonates will depend upon the amounts of compounds of Formulae I or II used in the preparation of the copolyester-carbonates. These units will be present in amounts at least effective to improve the impact properties of the copolyester-carbonate resins.

For example, if 10 weight percent of compound I is used in the preparation of the copolyester-carbonate resin, and assuming complete reaction, resin will contain 10 weight percent (total) of compounds VIa and VIIa.

The copolyester-carbonates of this invention may optionally have admixed therewith the aforedescribed additives.

The instant copolyester-carbonates generally have a weight average molecular weight of from about 20,000 to about 200,000, preferably from about 25,000 to about 150,000.

These copolyester-carbonates have an intrinsic viscosity, as measured in methylene chloride at 25° C., of at least about 0.4 dl/gm, preferably from about 0.45 to about 1.0 dl/gm.

DESCRIPTION OF THE PREFERRED EMBODIMENT

In order to more fully and clearly illustrate the present invention the following examples are set forth. It is intended that the examples be considered as illustrative of rather than limiting the invention as disclosed and claimed herein. In the examples all parts and percentages are on a weight basis unless otherwise specified.

The following example illustrates the preparation of poly(butadiene)bischloroformate, i.e., a compound of Formula II.

EXAMPLE 1

Into a cold (4° to 10° C.) solution of commercially available poly(butadiene)diol (average molecular weight of 2,800, containing 20% 1,2-, 20% cis- and 60% trans 1,4-) in 300 milliliters of methylene chloride, placed in a 3-necked flask provided with a stirrer, gas inlet tube, thermometer, and dry ice condenser, there was introduced phosgene at a rate of 0.5 gram/minute until a total of 15 grams (0.15 mole) was added. Nitrogen was purged slowly through the brownish orange colored solution until infrared analysis indicated the absence of phosgene at 1825 $cm^{-1}$ and of the hydrogen bonded hydroxyls in the 3250–3450 $cm^{-1}$ region and the presence of the chloroformate carbonyl at 1785 $cm^{-1}$, as well as of the characteristic hydrogen out-of-plane deformations of vinyl (at 924 and 1002 $cm^{-1}$), trans (975 $cm^{-1}$) and cis (697 $cm^{-1}$) olefinic modes.

The following example illustrates the preparation of a conventional prior art polycarbonate falling outside the scope of the instant invention. This example is presented for comparative purposes only.

EXAMPLE 2

Into a mixture of 2283 grams of 2,2-bis(4-hydroxyphenyl)propane (10 moles), 5700 grams water, 9275 grams methylene chloride, 30.1 grams (0.32 mole) phenol, and 10 grams triethylamine were introduced, at ambient temperature, 1180 grams phosgene over a period of 97 minutes while maintaining the pH of the two phase system at about 11, i.e., 10–12.5, by simultaneously adding a 25% aqueous sodium hydroxide solution. At the end of the addition period the pH of the aqueous phase was 11.7 and the bisphenol-A content of this phase was less than 1 part per million as determined by ultraviolet analysis. The methylene chloride phase was separated from the aqueous phase, washed with an excess of dilute (0.01N) aqueous HCl and then washed three times with deionized water. The polymer was precipitated by steam and dried at 95° C. The resultant, substantially pure bisphenol-A polycarbonate, which had an intrinsic viscosity, as measured in methylene chloride at 25° C., of 0.554 dl/gm, was fed to an extruder operated at about 550° F., and the extrudate was comminuted into pellets. The pellets were then injection molded into test samples measuring 125 and 250 mils thick for impact strength determination according to Notched Izod test, ASTM D-256, and for heat distortion temperature under Load (HDTUL) determination, ASTM D-648. Additionally the second order glass transition temperature and the Kasha Index of the resin were determined. The results of these tests are set forth in Table I.

The second order glass transition temperature (Tg) was determined using a Perkins-Elmer DSC-2B instrument which measures the second order glass transition temperature of the resin by differential scanning calorimetry.

The Kasha Index (KI) of the polycarbonate is an indication or measure of the processability of the resin. The lower the KI the greater the melt flow rate and, therefore, the better the processability of the resin. Basically, the KI is a measurement of the melt viscosity of the resin. The procedure for determining the Kasha Index is as follows: 7 grams of resin pellets, dried a minimum of 90 minutes at 125° C., are added to a modified Tinius-Olsen model T-3 melt indexer; the temperature in the indexer is maintained at 300° C. and the resin is heated at this temperature for 6 minutes; after 6 minutes the resin is forced through a 0.04125 inch radius orifice using a plunger of radius of 0.1865 inch and an applied force of 17.7 pounds; the time required for the plunger to travel 2 inches is measured in centiseconds and this is reported as the KI. The higher the KI the greater the melt viscosity and the more viscous the resin, and the more difficult it is to process. The lower the KI the better the processability of the resin.

The following example illustrates the preparation of a resin of the instant invention.

EXAMPLE 3

This example illustrates the preparation of a polycarbonate derived from bisphenol-A and a poly(butadiene)bischloroformate, i.e., a compound of Formula II.

The procedure of Example 2 is substantially repeated except that a solution of 114.2 grams (5 weight %) of a poly(butadiene)bischloroformates prepared substantially in accordance with the procedure of Example 1 was added to the reaction mixture prior to the introduction of phosgene.

The intrinsic viscosity of this resin, as measured in methylene chloride at 25° C., was determined to be 0.533 dl/gm. The resin was subjected to tests for determining the KI, HDTUL, and Notched Izod, and the results are set forth in Table I.

TABLE I

| Example No. | Notched Izod (ft. lb./in.) 125 mil | Notched Izod (ft. lb./in.) 250 mil | KI | Tg (°C.) | HDTUL (°C.) (at 264 psi) |
|---|---|---|---|---|---|
| 2 | 18.1[100]* | 2.1[0] | 6390 | 149 | 132.6 |
| 3 | 17.4[100] | 8.4[60] | 2700 | 148 | 123.4 |

*The superscripts indicate the percent ductility of failure of the samples.

As illustrated by the data in Table I the polycarbonate of the instant invention (Example 3) has improved thick section impact strength relative to the conventional polycarbonate resin (Example 2). The data also shows that the instant polycarbonate resin possesses better processability than the conventional prior art polycarbonate homopolymer of Example 2.

Additionally, the test samples from Example 3 were visually inspected and were transparent.

The instant carbonate resins are multi-phase block copolymers.

Because of the similarity in the Tgs of Examples 2 and 3 it is presumed that the polycarbonate phase of the instant multi-phase block copolymer is discrete.

The instant polycarbonates may be used to prepare molded articles, glazing products, shaped articles, and the like.

The foregoing detailed description has been given for clearness of understanding only and no unnecessary limitations are to be understood therefrom. The invention is not limited to the exact details shown and described for obvious modifications may occur to those skilled in the art.

What is claimed is:

1. An aromatic carbonate resin comprised of:
(i) at least one recurring structural unit represented by the formula

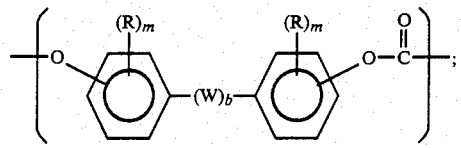

and
(ii) at least one recurring structural unit selected from structural units represented by the formulae

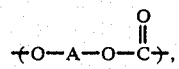

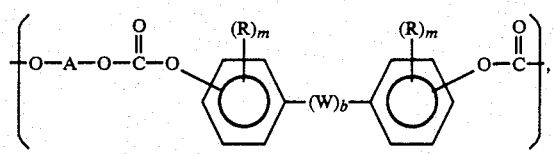

or mixtures thereof;
wherein
R is independently selected from halogen, monovalent hydrocarbon radicals, or monovalent hydrocarbonoxy radicals,
W is selected from divalent hydrocarbon radicals, —O—, —S—, —S—S—,

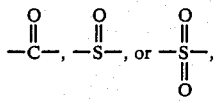

A is the divalent residue of at least one polymerized conjugated alkadiene and has a weight average molecular weight of at least about 600,
m is independently selected from integers having a value of from 0 to 4, and
b is either zero or one.

2. The resin of claim 1 which contains an amount of (ii) at least effective to improve the impact properties thereof.

3. The resin of claim 2 wherein said amount of (ii) is at least about 1.0 weight percent, based on the total amounts of (i) and (ii) present.

4. The resin of claim 3 wherein said amount is at least about 2 weight percent.

5. The resin of claim 4 wherein said amount is at least about 3 weight percent.

6. The resin of claim 5 wherein said amount is at least about 4 weight percent.

7. The resin of claim 1 which contains an amount of (ii) effective to impart to said resin rubbery and elastomeric properties.

8. The resin of claim 1 wherein said conjugated alkadiene is a monomer represented by the formula

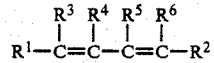

wherein $R^1$–$R^6$ are independently selected from hydrogen, halogen, or alkyl radicals, with the proviso that not more than two of $R^1$–$R^6$ are halogen radicals.

9. The resin of claim 8 wherein $R^1$-$R^6$ are independently selected from hydrogen or alkyl radicals.

10. The resin of claim 9 wherein said alkadiene is selected from 1,3-butadiene, 2-methyl-1,3-butadiene, or mixtures thereof.

11. The resin of claim 1 wherein (ii) is at least one recurring structural unit represented by the formula

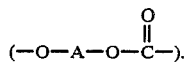

12. The resin of claim 11 wherein b is one.

13. The resin of claim 11 wherein W is 2,2-propylidene.

14. The resin of claim 13 wherein m is zero.

15. The resin of claim 1 wherein (ii) is at least one recurring structural unit represented by the formula

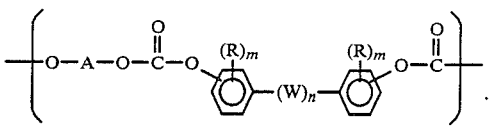

16. The resin of claim 15 wherein b is one.

17. The resin of claim 16 wherein W is 2,2-propylidene.

18. The resin of claim 17 wherein m is zero.

* * * * *